U S005777996A

United States Patent [19]

Chan et al.

[11] Patent Number: 5,777,996
[45] Date of Patent: Jul. 7, 1998

[54] INTER-REPEATER BACKPLANE FOR ALLOWING HOT-SWAPPING OF INDIVIDUAL REPEATER CIRCUITS

[75] Inventors: David T. Chan, Fair Oaks; Joseph E. Heideman, Orangevale; Haim Shafir, Sacramento; Stefan M. Wurster, Livermore; David S. Wong, Campbell, all of Calif.

[73] Assignee: Level One Communications, Inc., Sacramento, Calif.

[21] Appl. No.: 741,338

[22] Filed: Oct. 29, 1996

Related U.S. Application Data

[63] Continuation of Ser. No. 380,074, Jan. 30, 1995, abandoned.
[51] Int. Cl.$^6$ .............................. H04L 12/46; H04L 12/66
[52] U.S. Cl. .................. 370/402; 370/445; 370/910; 370/911; 375/211; 395/653
[58] Field of Search ......................... 370/246, 247, 370/242, 243, 248, 249, 445, 492, 501, 402, 497; 395/653; 359/174, 177; 375/211, 213; 379/338; 178/70 R

[56] References Cited

U.S. PATENT DOCUMENTS

| | | | |
|---|---|---|---|
| 4,063,220 | 12/1977 | Metcalfe et al. | |
| 4,099,024 | 7/1978 | Boggs et al. | |
| 5,249,183 | 9/1993 | Wong et al. | 370/228 |
| 5,345,447 | 9/1994 | Noel | 370/362 |
| 5,348,779 | 9/1994 | Patrick et al. | 370/434 |
| 5,386,567 | 1/1995 | Lien et al. | 395/700 |
| 5,430,762 | 7/1995 | Vijeh et al. | 370/445 |
| 5,517,520 | 5/1996 | Chi | 370/446 |

OTHER PUBLICATIONS

AT&T Microelectronics, *T7202 Smart Hub Controller (SHC)*, Preliminary Data Sheet, Sep. 1992, entire document.
AT&T *T7201 Multi-Port Repeater Unit (MPR2)*, Preliminary Data Sheet, Jun. 1990, entire document.
Micro Linear, *10BASE-T Transceiver for Multi-Port Repeaters*, Advance Information, Sep. 1989, pp. 1–10.
Advanced Micro Devices, Am79C981 Integrated Multiport Repeater Plus™ (IMR+™), Preliminary, Feb. 1993, entire document.
National Semiconductor, *DP83950A Repeater Interface Controller (RIC)*, Preliminary, Sep. 1991, entire document.
National Semiconductor, *DP83950A/DP83956 LitE End Repeater Interface Controller (LERIC™)*, Preliminary, May 1992, entire document.
AT&T, *T7240 Twisted–Pair Port Transceiver (TPORT) Issue 2*, Advance Data Sheet (DRAFT), 1989, entire document.

*Primary Examiner*—Alpus H. Hsu
*Assistant Examiner*—Seema S. Rao
*Attorney, Agent, or Firm*—Merchant, Gould, Smith, Edell, Welter & Schmidt, P.A.

[57] ABSTRACT

An inter-repeater backplane that allows seamless integration of multiple repeaters into a single hub and wherein each repeater may be swapped out without causing the backplane to crash, hang-up or pass error messages. The mixed signal state machines operate in conjunction with the dual analog, digital collision signaling scheme so that repeaters can be removed from the hub without causing the remaining repeaters in the hub to malfunction. Additional drivers or external glue logic are not needed for arbitration because PORTN and PORTM information is embedded within the backplane signals. Thus, the backplane scheme according to the present invention is completely seamless. The present invention provides a bus of electrically conductive signal lines coupled between repeaters for communicating electrical signals therebetween, collision signaling scheme that uses both analog and digital signals to convey state machine information to adjacent repeaters over the bus, collision force scheme for indicating transmit collision over the bus, monitor scheme for determining when transmit collision and PORTM conditions occur and mixed signal state machines for implementing the functions of the repeaters and controlling the transitions on the backplane. Thus, the unique analog digital backplane combination in conjunction with the repeater/IRB state machine makes bus arbitration unnecessary.

11 Claims, 5 Drawing Sheets

* COLLISION DEFINED AS A PORT THAT RECEIVES AND TRANSMITS AT THE SAME TIME.

REPEATER STATE DIAGRAM

INTER-REPEATER BACKPLANE FOR ALLOWING HOT-SWAPPING OF INDIVIDUAL REPEATER CIRCUITS

This is a Continuation of application Ser. No. 08/380,074, filed Jan. 30, 1995 now abandoned.

CROSS-REFERENCE TO RELATED APPLICATIONS

This application is related to:

Currently pending application Ser. No. 08/379,903, entitled "Inter-Repeater Backplane With Mixed Signal State Machine Interconnect," filed on same date herewith by R. Andersson et al., and assigned to the assignee of this application;

Currently pending application Ser. No. 08/379,907, entitled "Inter-Repeater Backplane With Synchronous/Asynchronous Dual Mode Operation," filed on same date herewith by R. Andersson et al., and assigned to the assignee of this application; and U.S Pat. No. 5,574,726, entitled "Inter-Repeater Backplane," filed on same date herewith by D. Chan et al., and assigned to the assignee of this application.

All of the above-identified applications are incorporated by reference herein.

BACKGROUND OF THE INVENTION

1. Field of the Invention

This invention relates in general to a form of backplane signaling that makes bus arbitration unnecessary and more particularly, to an inter-repeater backplane which allows repeaters mounted in a modular hub configuration to be removed and/or plugged in without causing the hub system to pass errors, crash, or hang up and does not require additional circuitry to take care of bus arbitration.

2. Description of Related Art

The communications industry has experienced phenomenal growth over the past several years. Much of this growth has occurred in the area of telecommunications involving computers and computer generated or stored data. The exchange of messages and data has been facilitated by the advent of local and metropolitan area networks. Remotely located computer users communicate over the local and metropolitan area networks to access data and to communicate with other remote computer users.

In such networks, nodes are connected to a bus and have multiple, or concurrent access to the communications medium. Control techniques are used to allow access to the communication medium and to resolve contention between the various users. Typically, a carrier sense, multiple access with collision detection (CSMA/CD) scheme is used. With CSMA/CD a node listens for activity and begins sending message packets when the node determines that no activity is occurring over the network. Sometimes simultaneous transmission by multiple nodes occurs. This results in collisions between the different message packets. When a node detects a collision, a signal is sent over the network to the other transmitting nodes. The affected nodes terminate their transmissions and probabilistically reschedule their next attempt to transmit.

The standard for Local and Metropolitan Area Network technologies is governed by IEEE Std. 802-1991. IEEE Std. 802-1991 describes the relationship among the family of 802 standards and their relationship to the ISO Open System Interconnection Basic Reference Model and is herein incorporated by reference. IEEE Std. 802.3-1991 defines the standards for a bus utilizing collision sense multiple access/collision detection (CSMA/CD) as a data link access method and is herein also incorporated by reference.

Typically, unshielded twisted pair cables or existing telephone wiring is used as the transmission medium to provide an economical solution to networking. However, the attenuation of signals transmitted over unshielded twisted pair cables increases as the distance between data terminal equipment becomes greater. Thus, repeaters are inserted in the twisted pair cables to facilitate greater distances.

To increase the number of data channels, repeater manufacturers have designed repeater hardware which can be cascaded together into a single hub. However, state machine information must be passed between the repeaters over a inter-repeater backplane in order to allow the repeaters to behave as a single hub.

Repeaters in the past have required arbitration to control the inter-repeater bus. Repeaters integrated into a single, modular hub could not be removed and/or plugged in without the additional circuitry to take care of bus arbitration or the removal of a signal contained therein. Accordingly, boards or repeater chips which were hot-swapped in or out caused the hub system to pass errors, crash, or hang up.

For example, The AT&T's MPR2 and SHC chips integrate repeater functions specified by Section 9 of the IEEE 802.3 Standard and twisted-pair transceiver functions complying with the 10Base-T standard. AT&T's MPR2 and SHC have an output pin (ACTIVE) which goes high when any input to the chip is detected. An expansion controller for the chip must be built from discrete logic to monitor the ACTIVE pin from each of the chip comprising the hub. The expansion controller is also needed to pass PORTM, PORTN, and collision information between the repeater chips on the hub. The arbitration scheme controls which chip is controlling the bus at any given time and how collision events are handled.

Another repeater which requires arbitration to control the inter-repeater bus is Advanced Micro Device's IMR+ repeater chip. Advanced Micro Device's IMR+has an output pin REQ(bar) which goes low when any input to the chip is detected. An expansion controller for the chip must be built from discrete logic to monitor the REQ(bar) pin from each of the chips comprising the hub. The expansion controller is also needed to pass PORTN between the repeater chips. The arbitration scheme controls which chip is controlling the bus at any given time.

Still another repeater which requires arbitration to control the inter-repeater bus is National Semiconductor's RIC and LERIC chips. National Semiconductor's RIC and LERIC chips are more seamless than the repeaters designed by AT&T and Advanced Micro Devices. Nevertheless, to prevent crashes, hang-ups, and to pass error messages, National Semiconductor's RIC chip requires a priority assignment for each of its 13 ports. The top and bottom of this chain is available to the user so that for a multiple chip hub, there will be a daisy chained priority assignment where the AUI port on the first chip has the highest priority and twisted pair port number 12 on the last chip has the lowest priority.

For small configurations, the RICs arbitration scheme is easy to implement. The chip's ACKI(bar) and ACKO(bar) pins can be daisy chained directly, input to output. However, for larger systems the National Semiconductor RIC chip runs into problems with its port arbitration scheme. If a system backplane is used with each RIC placed on a plug-in PC board, the user is forced to use external logic to perform arbitration. The alternative is the already discussed daisy chain arbitration which will disable all the ports lower in the chain if a higher priority board is removed. Further, PORTM and PORTN need this arbitration scheme to be passed between the repeater chips and interpreted correctly.

There is a need, therefore, for an inter-repeater backplane that allows seamless integration of multiple repeaters into a single hub, wherein each repeater may be swapped out without causing the backplane to crash, hang-up or pass error messages. There is also a need for an inter-repeater backplane which does not require additional drivers or external glue logic to implement a multiple board system design which allows hot swapping of individual repeaters.

SUMMARY OF THE INVENTION

To overcome the limitations in the prior art described above, and to overcome other limitations that will become apparent upon reading and understanding the present specification, the present invention discloses an inter-repeater backplane that allows seamless integration of multiple repeaters into a single hub, wherein each repeater may be swapped out without causing the backplane to crash, hang-up or pass error messages. The inter-repeater backplane thus allows hot-swapping of individual repeaters or boards without requiring additional drivers or external glue logic to implement a multiple board system design.

The present invention solves the above-described problems by providing a common shared bus of electrically conductive signal lines coupled between repeaters for communicating electrical signals therebetween, collision signaling means that uses both analog and digital signals to convey state machine information to adjacent repeaters over the bus, collision flag means for indicating transmit collision over the bus, monitor means for determining when transmit collision and PORT M conditions occur and mixed signal state machines for implementing the functions of the repeaters and controlling the transitions on the backplane. The mixed signal state machines operate in conjunction with the dual analog, digital collision signaling means so that repeaters can be removed from the hub without causing the remaining repeaters in the hub to malfunction.

The backplane is a common shared bus that does not use daisy chaining (i.e., no serial lines) between resister modules thereby enabling repeaters connected to the bus to be hot-swapped. This backplane scheme according to the present invention is completely seamless. For small configurations, the inter-repeater backplane pins can be tied directly. For large systems, loading on the backplane contributed by the plug-in repeater modules is the factor that limits direct chip to chip interconnection. For large capacitive loading, the inter-repeater backplane supports the use of external buffers. No additional logic is required for a large system configuration.

The unique analog/digital backplane combination in conjunction with the repeater/IRB (inter-repeater backplane) state machines make bus arbitration unnecessary. PORTN and PORTM information is embedded within the backplane signals and hence obviate the need for arbitration. Thus, the inter-repeater backplane can be hot-swapped without needing external logic. For example, a repeater connected to the inter-repeater backplane according to the present invention may be mounted on a PC board in a modular hub configuration. The repeater can be removed and/or plugged in without additional circuitry to take care of bus arbitration or the removal of a signal contained therein. Further, a board hot-swapped will not cause the repeater to pass errors, crash, or hang up.

These and various other advantages and features of novelty which characterize the invention or point out with particularity in the claims annexed hereto and form a part hereof. However, for a better understanding of the invention, its advantages, and the objects obtained by its use, reference should be made to the drawings which form a further part hereof, and to the accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an inter-repeater backplane which allows multiple repeaters to operate as a single hub wherein individual repeaters or boards may be hot-swapped out without causing the backplane to crash or hang-up. According to the present invention, repeaters are linked via an inter-repeater backplane which employs both analog and digital circuitry to convey state machine information. Thus, the inter-repeater backplane of the present invention allows seamless integration at the system level because the repeaters themselves require no additional drivers or external glue logic to implement a multiple board system design.

Figure 1:
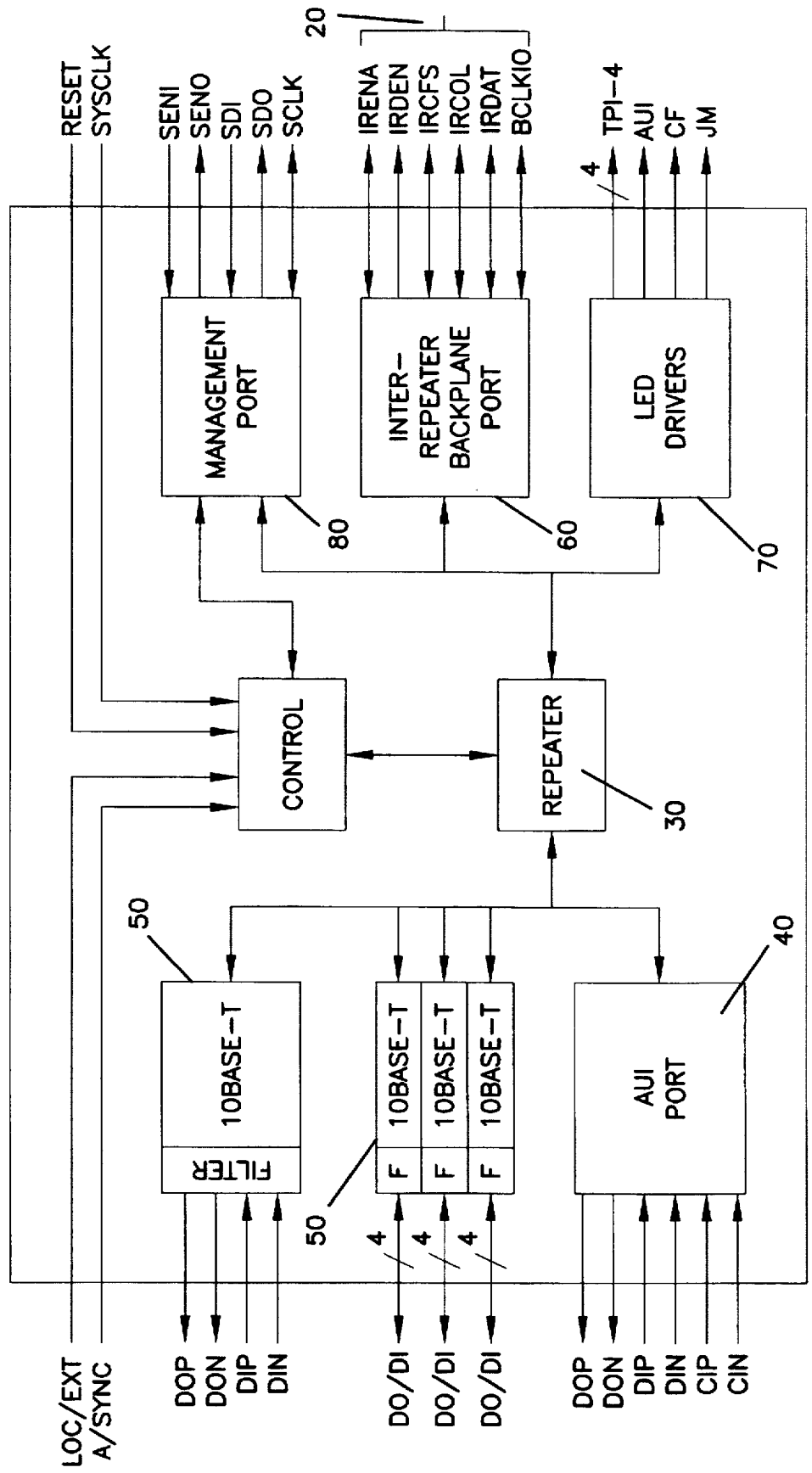
FIG. 1 is a system diagram of an exemplary repeater which can be cascaded together in accordance with the inter-repeater backplane of the present invention.

For a better understanding of the present invention, FIG. 1 illustrates an exemplary integrated hub repeater 10 for 10Base-T networks which may be combined via an inter-repeater backplane 20 according to the present invention. Typically, repeaters include a global repeater state machine, several timers and counters, a timing recovery circuit 30, and a FIFO for performing rate adaptation between transmit and receive clocks. The repeaters may also include at least one Attachment Unit Interface (AUI) port 40 and a plurality of 10Base-T transceiver ports 50. AUI ports 40 are utilized to connect the repeater to other external transceivers (e.g. 10Base-2, 10Base-5, 10Base-T, or FOIRL) or to a drop cable.

According to the present invention, repeaters are connected to an inter-repeater backplane by way of an inter-repeater backplane expansion port 60. The inter-repeater backplane expansion port 60 facilitates the interconnection of a large number of 10Base-T ports 50 into an integrated single repeater hub. Further, LED's may be connected to the repeater unit to indicate status of the repeater and may be driven by LED drivers 70. Finally, a network management port 80 may be provided to facilitate network management for both a Media Access Controller (MAC) layer and a physical layer.

Figure 2:
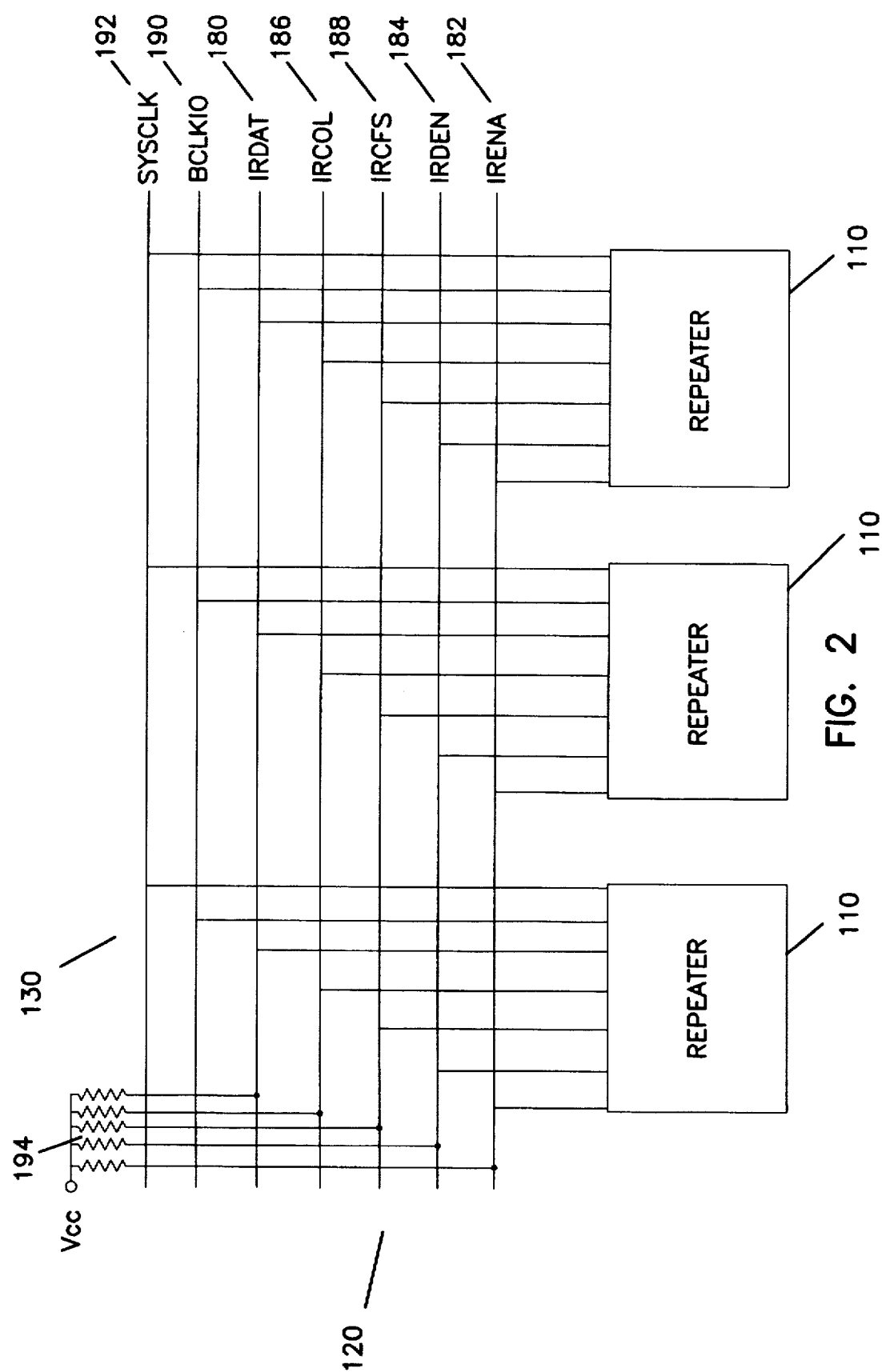
FIG. 2 is a block diagram of repeaters integrated into a single hub via the inter-repeater backplane.

FIG. 2 illustrates several multi-port repeaters 110 cascaded together to link several 10Base-T ports together via the inter-repeater backplane 120, according to the present invention, to form a single hub 130. The inter-repeater backplane 120 provides the communication medium between each repeater 110. By way of collision signaling on the inter-repeater backplane, all connected repeaters share collision parameters, thereby acting as a single large repeater.

The inter-repeater backplane accommodates seven signals, i.e. IRDAT 180, IRENA 182, IRDEN 184, IRCOL 186, IRCFS 188, BCLKIO 190 and SYSCLK 192. IRDAT 180 is the inter-repeater backplane data path which allows the passage of data between multiple repeaters 110 on the inter-repeater backplane 120. IRENA 182 is the inter-repeater backplane enable which allows individual repeaters 110 to take control of the inter-repeater backplane data bus 180. IRDEN 184 is the inter-repeater backplane driver enable which is used to enable external bus drivers which may be required in synchronous systems with large backplanes. IRDEN 184 is an active low signal which is maintained for the duration of the data transmission.

BCLKIO 190 is the inter-repeater backplane clock. The backplane clock 190 is used to synchronize multiple repeaters 110 on the inter-repeater backplane 120. In the asynchronous mode, BCLKIO 190 is supplied only when a repeater 110 is outputting data to the bus 120. Each repeater 110 outputs its internally recovered clock when it takes control of the bus 120. Other repeaters 110 on the backplane 120 then rate adapt with a FIFO (to BCLKIO 190) for the duration of the transmission. In synchronous mode, BCLKIO 190 must be supplied to all repeaters 110 from a common external source.

SYSCLK 192 is the system clock. For both synchronous and asynchronous modes, the system clock is distributed over the backplane from a central source. In synchronous mode, BCLKIO 190 is derived from SYSCLK 192.

The inter-repeater backplane 120, according to the present invention, provides collision signaling via a mixed signal state machine interconnect. Collision signaling, according to the present invention, utilizes both analog and digital circuitry to convey state machine information to adjacent chips. The collision signaling is handled by IRCOL 186 and IRCFS 188. IRCOL 186 signals collisions and IRCFS 188 is the inter-repeater backplane collision force sense. IRCOL 186 is a digital open-drain signal whereas IRCFS 188 is an analog/digital signal. Both the IRCOL bus 186 and the IRCFS bus 188 must be pulled-up globally. In other words, a pull-up resister 194 must be coupled to each bus. Open drain drivers are required to prevent contention since multiple repeaters will simultaneously be driving, in collision, IRCOL 186 and IRCFS 188, or attempting to drive IRDAT 180, IRENA 182, IRDEN 184 when two repeaters receive data at exactly the same time. All repeaters 110 in the system monitor the bidirectional pin, IRCFS 188 and IRCOL 186, for transmit collision, PORTM ("one port left state") and IRENA 182 for PORTN (the specific port of a repeater receiving data) information. The hub that receives a packet controls the backplane signaling.

The repeater receiving data will pull IRENA 182 low. In addition, that repeater will pull current (approximately 7 milliamps) through the external pullup resistor. This will create a voltage at IRCFS 188 which is approximately one-half of $V_{cc}$. The voltage which is sensed (or scanned) at IRCFS 188 is one-third of $V_{cc}$. If two repeaters receive data at the same time, they will both pull IRENA 182 low and will both pull current through IRCFS 188. When this occurs, IRCFS 188 will be below the threshold and transmit collision is entered. If only one repeater is receiving data, IRENA 182 lets other repeaters in the hub know PORTN has been assigned and prevents the other repeaters from attempting to gain control of the backplane.

Figure 3:
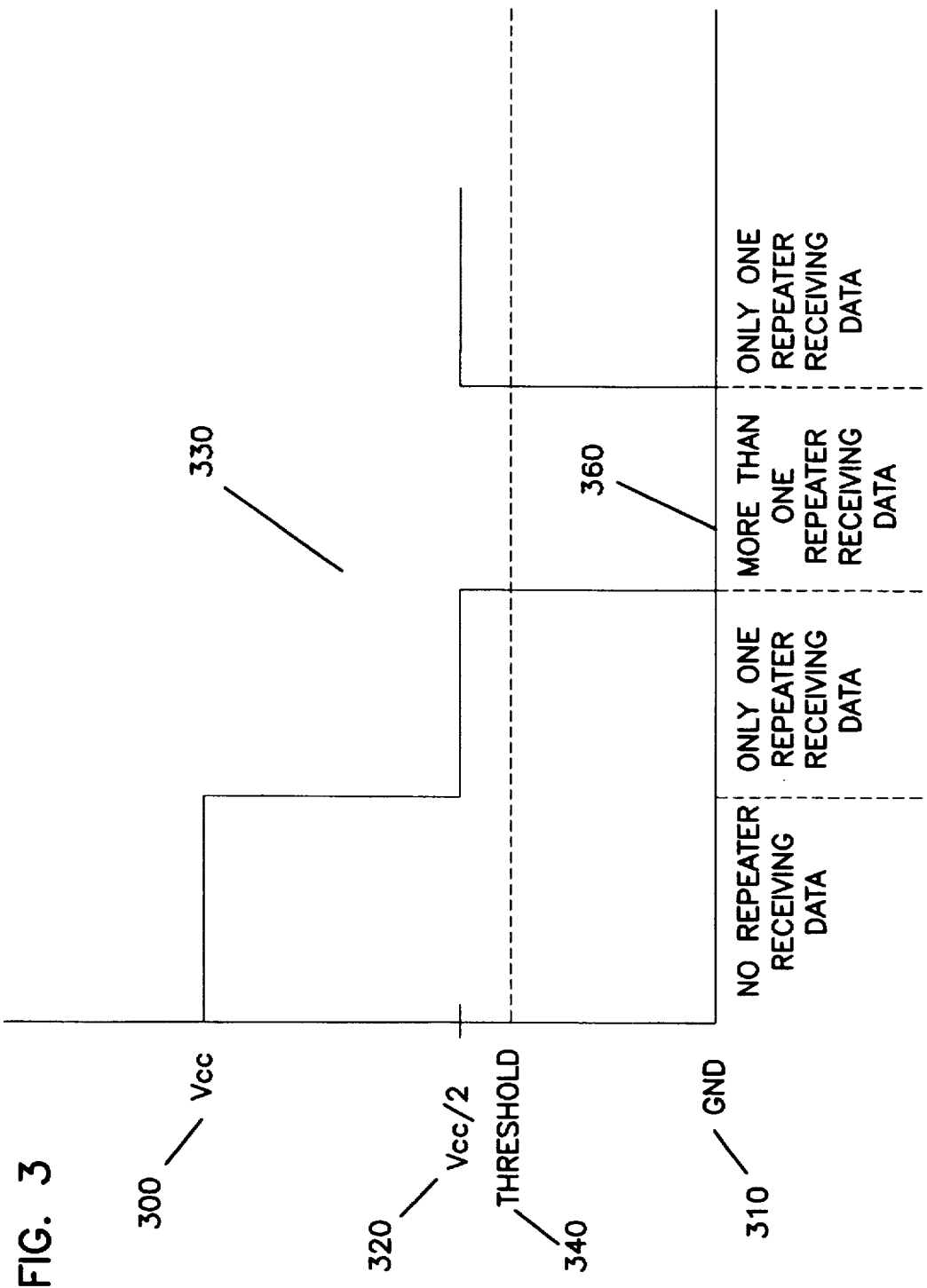
FIG. 3 is a graph of the collision force sense voltage conveyed over the inter-repeater backplane.

Now referring to FIG. 3, the voltage level on the interconnect is always at one of three values: power source level 300, ground 310 and an intermediate level 320. The signal detected on the mixed signal state machine interconnect conveys whether a collision has occurred according to the magnitude of the detected voltage level 330.

Now referring both to FIG. 2 and FIG. 3, IRCFS 188 sinks a controlled amount of current through the external pull-up resistors 194 which is common to all repeaters 110 in the system to attain a voltage intermediate to power 300 and ground 310. External resistors 194 are chosen so that two constraints are met. A hub 130 will drive IRCFS 188 low 360 if it detects a transmit collision but IRCFS 188 will otherwise remain in the intermediate range 320 when data is being received by any single repeater 110 on the bus 120.

The IRCFS voltage level 330 is initially at the power source level 300. When a single repeater 110 receives data, the IRCFS voltage level 330 falls below the initial IRCFS voltage level 300 due to the voltage drop across the global pull-up resistors 194. However, this intermediate IRCFS voltage level 320 remains sufficiently high so as to be perceived as a TTL logic high to other repeaters 110 in the hub 130. Threshold monitoring is performed by a comparator having its threshold set at one-third of $V_{cc}$. This voltage is approximately the same as that of a TTL high.

If a second repeater 110 receives a packet of data at the same time, the second repeater 110 will also sink the same amount of current through the external pull-up resistor 192. This will cause the IRCFS voltage 330 to drop below a predetermined threshold 340 such as a TTL logic low. This condition informs all other repeaters 110 in the hub 130 that a transmit collision state 360 has been entered. This state 360 will exist as long as more than one repeater 110 is receiving data or for 96 bits, whichever is longer.

Thus, as an input, the hub 130 implements a threshold sensing scheme to allow a hub 130 to detect when multiple repeaters 110 are receiving data simultaneously. By comparing the voltage level 330 of the IRCFS bus 188 with a predetermined threshold level 340, transmit collision can be detected. As an output, IRCFS 188 is driven to an intermediate voltage 320 by the repeater 110 receiving data to signify to other repeaters 110 that a repeater 110 is receiving data. IRCFS 188 in conjunction with the digital pin, IRCOL 186, is used to indicate this PORTM (only one repeater remains in collision) condition after the system has gone into a transmit collision state 360.

The identification of the port receiving data (PORTN) is established internally within that receiving chip. PORTN is conveyed to the other repeaters in the hub by virtue of the fact that the data framing signal, IRENA 182, was pulled low by the repeater 110 receiving data.

Figure 4:
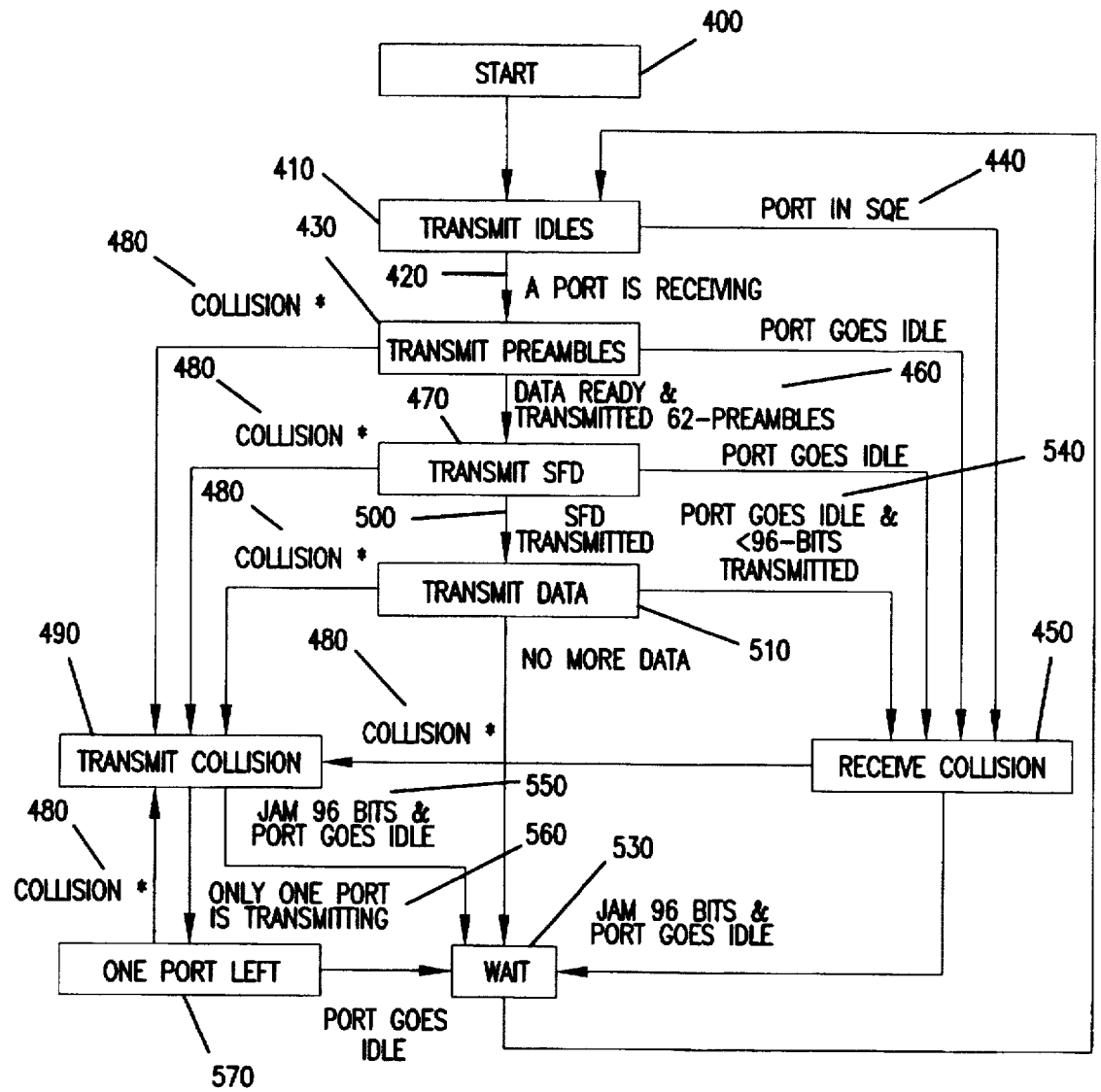
FIG. 4 is a state diagram illustrating the repeater state machine.
Figure 5:
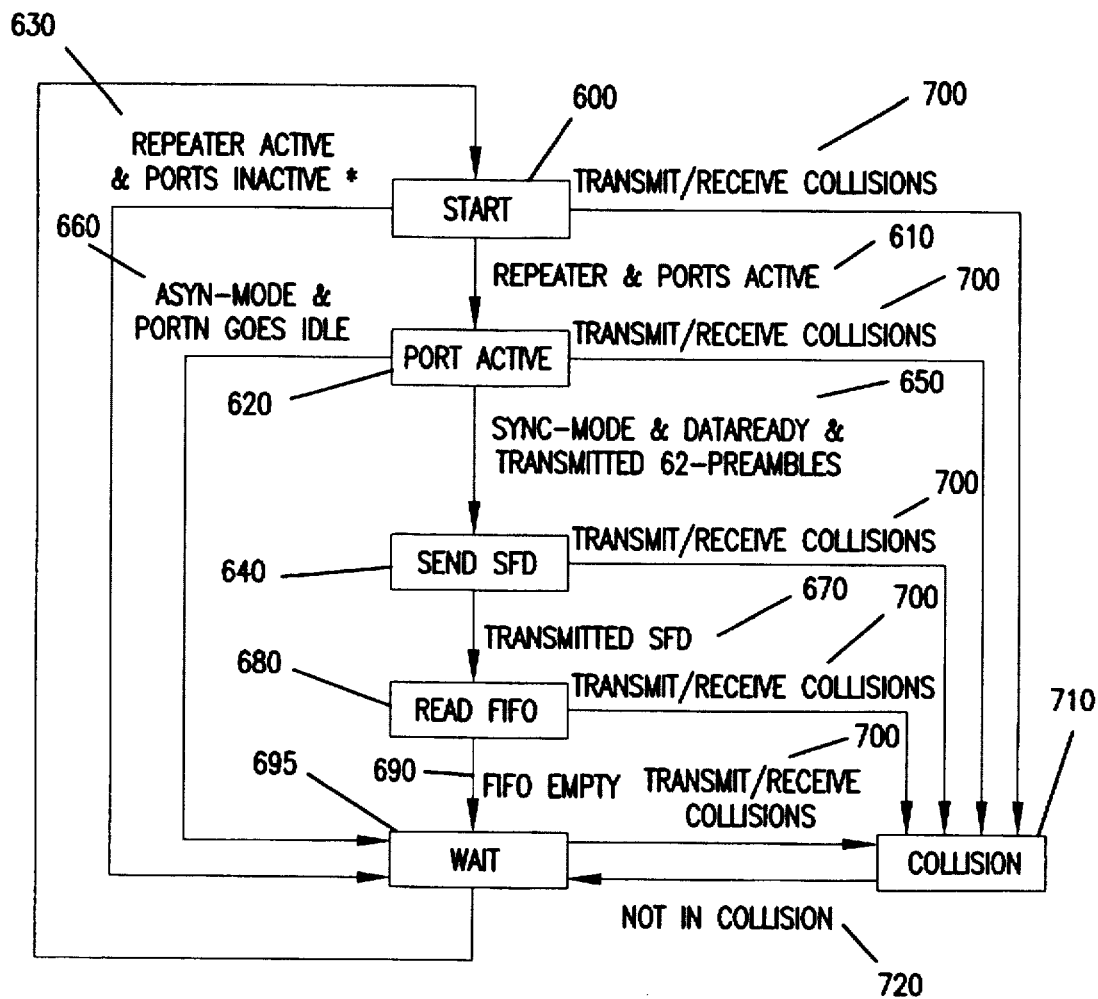
FIG. 5 is a state diagram illustrating the backplane state machine.

Two state machines are utilized to implement the hot-swapping scheme which allows repeaters mounted in a modular hub configuration to be removed and/or plugged in without causing the hub system to pass errors, crash, or hang up and does not require additional circuitry to take care of bus arbitration. The state diagram of the repeater state machine is shown in FIG. 4. The state diagram for the inter-repeater state machine is shown in FIG. 5. Together they comply with the 802.3 Repeater State Machine requirements established by Section 9 of the IEEE 802.3 Standard. The state machines allow repeaters to transmit data in both synchronous and asynchronous modes. These state machines comply with 802.3 IEEE Standards and facilitate both synchronous and asynchronous data transmission without requiring an external bus and a bus arbiter.

The repeater state machine will be described with reference to FIG. 4. Upon being energized 400 repeaters enter an idle state 410. When a port on a repeater receives data 420, the repeater begins to transmit a preamble pattern 430 unless a port on that repeater is in signal quality error transmission SQE 440. In the latter case, the repeater transitions to the receive collision state 450. When the data is ready to be transmitted and 62 preambles have been transmitted 460, the machine transitions to the transmit SFD (start of frame) state 470. However, if a port goes idle during the transmission of the preambles 430 or during the transmission of SFD 470, the repeater transitions to the receive collision state 450. Whenever a port receives and transmits at the same time 480, then the transmit collision state 490 is entered.

Once the SFD is transmitted 500, the repeater transitions to the transmit data state 510. When all of the data has been transmitted 520, the repeater transitions to the wait state 530 before finally recycling to the transmit idle state. However, if a port goes idle on the repeater and less than 96 bits were transmitted 540, the repeater transitions to the receive collision state 450.

As described above, whenever a collision is detected 480, the repeater transitions to the transmit collision state 490. If no data are being received on its ports after the repeater transmits a Jam of 96 bits to all of the ports to which it is connected 550, the port goes idle 550 and the repeater state machine transitions to the wait state 530. If only one port is receiving data 560, when the repeater is in the transmit collision state 490 after jamming for 96 bits, the repeater enters the one port left state 570. If a collision is detected, the repeater returns from the one port left state 570 to the transmit collision state 490.

The backplane state machine will be described with reference to FIG. 5. The backplane is initialized in the start state 600. When the repeater and ports become active 610, the backplane transitions to the port active state 620. If the repeater is active but the ports remain inactive 630, the backplane transitions from the start state 600 to the wait state 695 instead.

The backplane transitions from the port active state 620 to the send SFD state 640 after 62 preambles are sent if the repeater is set for synchronous data transmission and the data is ready to be transmitted 650. However, if the repeater is set for asynchronous mode of data transmission and PORTN goes idle 660, the repeater transitions to the wait state 695.

Once the SFD signal has been transmitted 670, the backplane transitions to the read FIFO state 680. Once the FIFO buffer is empty 690, the backplane transitions to the wait state 695. Thereafter the backplane recycles to the start state 600. If another repeater on the backplane is receiving data 700, the backplane transitions from the state therein to the collision state 710. When only one or no repeater on the backplane is receiving data 720, the backplane transitions from the collision state 710 to the wait state 695.

The unique analog, digital backplane combination in conjunction with the repeater/IRB state machine makes bus arbitration unnecessary. PORTN and PORTM information is embedded within the backplane signals and hence the lack of arbitration. Repeaters can be removed and/or plugged in without additional circuitry to take care of bus arbitration or the removal of a signal contained therein. Further, a board hot-swapped will not cause the repeater to pass errors, crash, or hang up.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An inter-repeater backplane connecting multiple repeaters to form a hub system, the backplane allowing hot-swapping of a first repeater from the hub system without passing errors, causing hang-ups, and crashing a second repeater in the hub system, the backplane comprising:

a data path, coupled between a plurality of repeaters, for passing data between multiple repeaters;

an enable signal path, parallel to the data path, for indicating whether a repeater may transmit data over the data path; and collision signaling path, coupled between the plurality of repeaters, for conveying data path status information utilizing a distributed tri-state signal, the tri-state signal indicating more than one repeater is receiving data, one repeater is receiving data or no repeater is receiving data, the tri-state signal allowing a repeater to be removed or added to the hub system without interrupting the conveyance of data path status information.

2. The inter-repeater backplane of claim 1 further comprising a mixed signal state machine for implementing functions of repeaters and controlling transitions on the data path, the mixed signal state machine operating with the tri-state signaling to facilitate hot swapping of repeaters.

3. The inter-repeater backplane of claim 1, wherein the collision signaling path generates an analog voltage inversely proportional to a number of repeaters receiving data.

4. The inter-repeater backplane of claim 3, wherein the analog voltage latches below a predetermined threshold when more than one repeater is receiving data.

5. The inter-repeater backplane of claim 1 further comprising a clock signal path to provide a clock signal for synchronizing data transmission on the data path.

6. The inter-repeater backplane of claim 1, wherein the tri-state signal latches below a predetermined threshold when more than one repeater is receiving data.

7. A method of providing an inter-repeater backplane for connecting multiple repeaters to form a hub system, the method allowing hot-swapping of a first repeater from the hub system without passing errors, causing hang-ups, and crashing a second repeater in the hub system, the method comprising the steps of:

controlling access to a data path between a plurality of repeaters by conveying whether a repeater may transmit data over the data path;

passing data between the plurality of repeaters; and indicating the status of the data path using a distributed tri-state signal, the tri-state signal indicating more than one repeater is receiving data, one repeater is receiving data or no repeater is receiving data, the tri-state signal allowing a repeater to be removed or added to the hub system without interrupting data path status indication.

8. The method of claim 7, wherein the step of indicating the status of the data path further comprises the step of generating an analog voltage inversely proportional to a number of repeaters receiving data.

9. The method of claim 8, wherein the step of generating the analog voltage further comprises the step of latching an analog voltage below a predetermined threshold when more than one repeater is receiving data.

10. The method of claim 7 further comprising the step of synchronizing data transmission on the data path using a clock signal.

11. The method of claim 7, wherein the step of indicating the status of the data path further comprises the step of latching an analog voltage below a predetermined threshold when more than one repeater is receiving data.

* * * * *